United States Patent [19]
Vuitton

[11] Patent Number: 5,466,907
[45] Date of Patent: Nov. 14, 1995

[54] PROCESS FOR COATING THE INTERNAL SURFACES OF HOLLOW BODIES

[75] Inventor: Jacques M. Vuitton, Saint Jean de Gonville, France

[73] Assignee: Praxair S.T. Technology, Inc., Danbury, Conn.

[21] Appl. No.: 121,484

[22] Filed: Sep. 16, 1993

[51] Int. Cl.⁶ .................................................. B23K 10/00
[52] U.S. Cl. ........................... 219/121.59; 219/121.47; 219/76.16; 427/217; 427/230
[58] Field of Search ................ 219/121.59, 121.46, 219/76.16, 121.48; 427/217, 230–239

[56] References Cited

U.S. PATENT DOCUMENTS

| | | | |
|---|---|---|---|
| 3,729,803 | 5/1973 | Maksutov et al. | 29/421 |
| 4,627,958 | 12/1986 | Hays | 419/8 |
| 5,019,417 | 5/1991 | Northcutt | 427/54.1 |
| 5,135,777 | 8/1992 | Davis et al. | 427/217 |

*Primary Examiner*—Mark H. Paschall
*Attorney, Agent, or Firm*—Cornelius F. O'Brien

[57] ABSTRACT

A process of coating the internal surface of a hollow body by depositing a coating on a substrate having an external surface similar to the internal surface of the hollow body; inserting the coated substrate to mate within and contact the internal surface of the hollow body; and then removing the substrate while leaving the coating secured to the internal surface of the hollow body.

16 Claims, 2 Drawing Sheets

PROCESS FOR COATING THE INTERNAL SURFACES OF HOLLOW BODIES

FIELD OF THE INVENTION

The present invention relates to the coating of the internal surfaces of hollow bodies such as small diameter cylinders.

BACKGROUND OF THE INVENTION

In plasma spray coating technology, coatings are applied by injecting a powder into a plasma stream where they are heated, accelerated and then impinging the stream upon a surface, the point at which the stream impinges upon the surface or the impingement point, is moved over the surface, by moving the torch body and/or the object. In order to achieve an optimal coating, the angle of the axis of the plasma stream to the substrate surface at the moving impingement point should be maintained perpendicular. In addition, the standoff, the distance between the nozzle of the torch and the impingement point should be maintained substantially constant as the impingement point moves over the surface. An additional requirement for an optimal coating is that the impingement point move across the surface at a substantially constant rate. For simple surfaces of revolution, such as cylinders, conical sections, and annular surfaces, these requirements are met by merely rotating the object and moving the torch at a constant rate along a straight line.

Flame plating by means of detonation using a detonating gun (D-Gun) has been used in industry to produce coatings of various compositions for over a quarter of a century. Basically, the detonation gun consists of a fluid-cooled barrel having a small inner diameter of about one inch. Generally a mixture of oxygen and acetylene is fed into the gun along with a comminuted coating material. The oxygen-acetylene fuel gas mixture is ignited to produce a detonation wave which travels down the barrel of the gun where it heats the coating material and propels the coating material out of the gun onto an article to be coated. U.S. Pat. No. 2,714,563 discloses a method and apparatus which utilizes detonation waves for flame coating. Using a detonation means with suitable coating materials can produce coatings having various characteristics, such as erosion resistant coatings, hard coatings and the like. Similar to plasma coating techniques, the detonation coating techniques require a barrel for the combustible gases and generally for optimal coating applications, the angle of the axis of the existing gases to the substrate surface should be maintained substantially perpendicular. For simple surfaces of revolution, this requirement is met by merely rotating the object and moving the barrel of the gun at a constant rate along a straight line.

For small hollow bodies, the requirements for achieving an optimal coating are particularly difficult to achieve. For example, it is difficult to coat the internal surface of a small diameter cylinder since the plasma torch or barrel of the detonation gun could be too large to be projected into the small diameter cylinder. The difficulty is due in large part to the size of the plasma torch or barrel of the detonation gun with reference to the internal volume of a hollow body. To coat the internal surface of a small diameter cylinder, one has to resort to electrolytic plating or centrifugal cast alloy techniques. However, these techniques may not be suitable for producing hard coatings on the internal surface of small diameter cylinders.

It is an object of the present invention to provide a process for thermal coating the internal surface of a hollow body.

It is another object of the present invention to provide a process for thermal coating the internal surface of a small diameter cylinder using plasma or detonation gun or other thermal spray techniques, electrolytic, electroless, physical vapor deposition (PVD), chemical vapor deposition (CVD), high velocity oxy-fuel (HVOF) or any other conventional technique.

It is another object of the present invention to provide an efficient and cost effective process of coating the internal surface of a hollow body using plasma or detonation gun techniques.

Further objects will become evident from the drawings and in the description of the invention that follows.

SUMMARY OF THE INVENTION

The invention relates to a process for coating the internal surface of a hollow body comprising the steps:

(a) preparing a hollow body for receiving on at least a portion of its internal surface a coating;

(b) preparing a substrate having at least a portion of its external surface shaped to correspond to the internal surface of the hollow body to be coated;

(c) depositing on at least the portion of the external surface of the substrate a coating of a desired thickness and composition;

(d) inserting the coated substrate into the hollow body so that the coated surface of the substrate faces the internal surface of the hollow body; and (e) removing the substrate from the hollow body while leaving the layer of coating in contact with the internal surface of the hollow body thereby providing said hollow body with an internal coating.

In accordance with this invention, the substrate could be removed from the hollow body by chemical, thermal, mechanical or any other suitable means. The external dimension of the substrate will generally be equal to or slightly less than the internal dimension of the hollow body so that it can be inserted into the hollow body. The thickness of the coated layer can vary depending on the particular environment that the internal coated body will be used in. For a thicker coated layer, within a fixed sized hollow body, the external dimension of the substrate will be less than the external dimension of a substrate where a thinner coated layer is desired. In accordance with this invention, a coated layer could comprise one or more layers of the same composition or different coating compositions.

The substrate for use in this invention can be any material that could be removed from the hollow body by mechanical, chemical or thermal means without damaging the coated layer and the hollow body. For example when using lead or wax as the substrate, the assembled unit can be heated to a temperature sufficient to melt the substrate while not affecting the hollow body or the coated layer. When using a substrate having a higher melting point than the coating or hollow body, the substrate could be removed mechanically by drilling or some other technique. It is also possible to remove the substrate by chemical means in which the substrate could be dissolved out of the hollow body without affecting the coated layer. Accordingly, the material of the hollow body and the coated layer will determine what material to be used for the substrate.

Although it is generally preferable to have the external dimension of the coated substrate equal to or slightly less than the internal dimension of the hollow body, the external dimension of the coated substrate could be greater than the internal dimension of the hollow body. In this embodiment, the hollow body could be heated to expand and then the coated substrate could be inserted into the heated hollow body. Upon cooling, the internal surface of the hollow body will contract and adhere to the top surface of the coated layer. The substrate would then be removed leaving an internally coated hollow body. The preferred hollow body for use in this invention is a cylinder in which the length is greater than the diameter and in some applications the internal surface could have an irregular contour. Generally, the internal volume of the hollow body would be too small to accommodate the apparatus for depositing the coating. The coated layer could vary in thickness from 0.01 micron to 100 microns or above.

When using a thermal spray means to deposit the coating, the substrate should preferably be able to absorb thermal expansion and mechanical stress. Suitable substrate materials for use in this invention include but are not limited to lead, copper, aluminum, zinc, iron, nickel, and cobalt or alloys thereof as well as fibers and polymeric materials. Suitable hollow body material for use in this invention are steel, nickel, cobalt, titanium, copper,aluminum and alloys thereof, carbon-carbon composites, fiber reinforced composites, polymeric materials or any other material. The coating composition for use in this invention is any composition that will provide a coated layer for use in a specific environment. Some applications may require a wear resistant coated layer, a hard coated layer, a coated layer inert to a specific environment or a combination of two or more of these characteristics. Thus the coating composition can include any conventional type of coating material. Examples of suitable coating compositions for use with this invention would include tungsten carbide, nickel base coating, tungsten carbide-cobalt chromium, tungsten carbide-nickel chromium, chromium-nickel, aluminum oxide, chromium carbide-nickel chromium, chromium carbide-cobalt chromium, tungsten-titanium carbide-nickel, cobalt alloys, oxide dispersion in cobalt alloys, alumina-titania, copper based alloys, chromium based alloys, chromium oxide, chromium oxide plus aluminum oxide, titanium oxide, titanium plus aluminum oxide, iron based-alloys, oxide dispersed in iron based-alloys, nickel, nickel based alloys, and the like. These coating materials are ideally suited for coating internal surfaces of hollow bodies made of materials such as titanium, steel, aluminum nickel, cobalt, alloys thereof and the like.

DETAILED DESCRIPTION OF DRAWINGS

Figure 1:
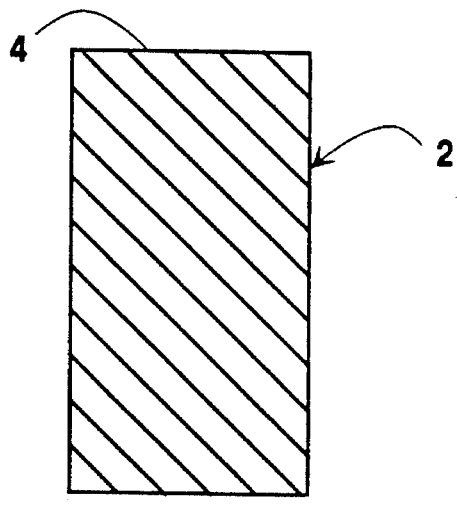
FIG. 1 is a cross-sectional view of a solid cylinder.
Figure 2:
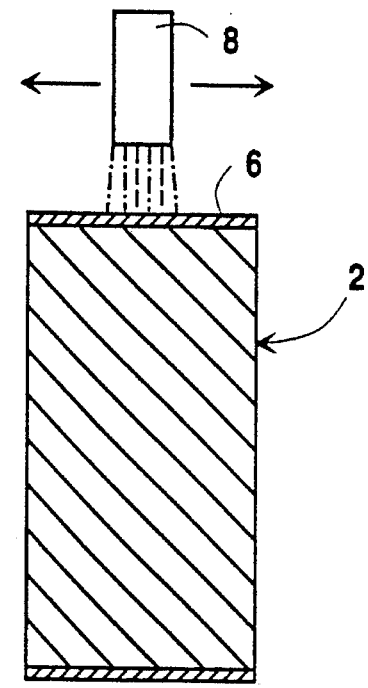
FIG. 2 is a cross-sectional view of the cylinder of FIG. 1 being coated with a first layer.
Figure 3:
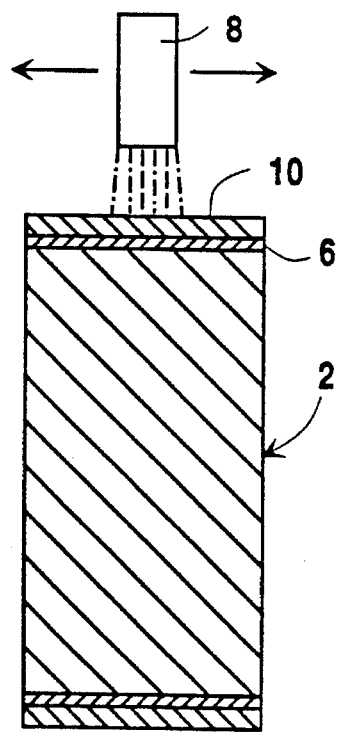
FIG. 3 is a cross-sectional view of the coated cylinder of FIG. 2 being coated with a second layer.
Figure 6:
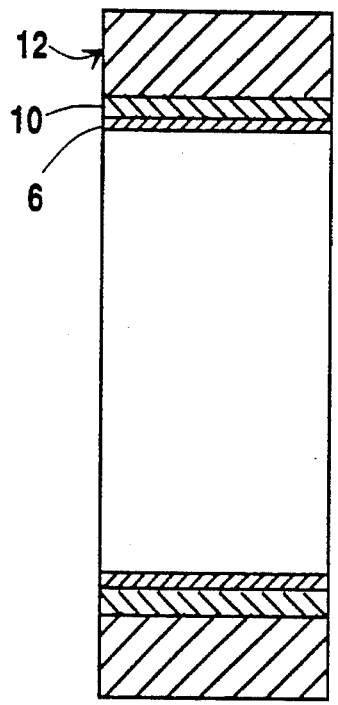
FIG. 6 is a cross-sectional view of the hollow cylinder shown in FIG. 4, having an internally applied coated layer.
Figure 4:
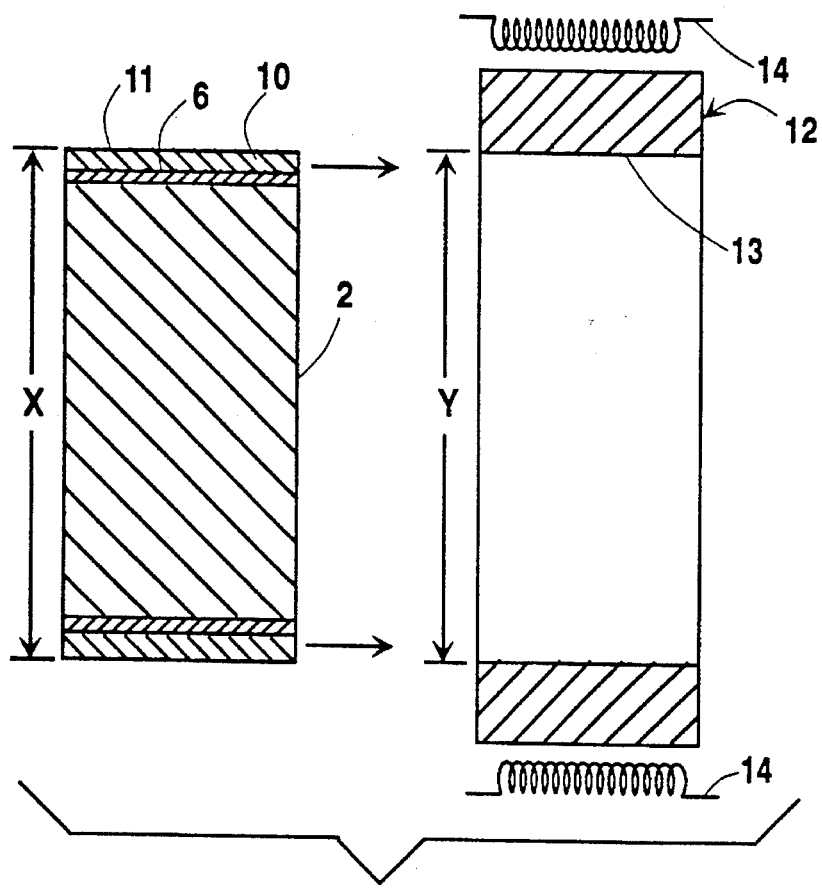
FIG. 4 is an exploded cross-sectional view of the coated cylinder of FIG. 3 aligned with a hollow cylinder.
Figure 5:
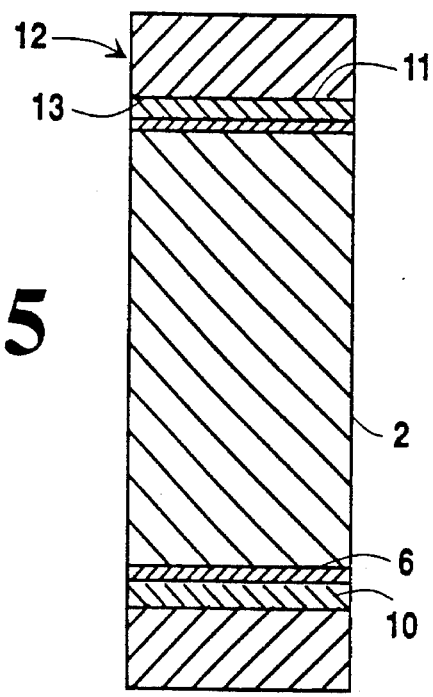
FIG. 5 is a cross-sectional view of the coated cylinder of FIG. 3 assembled within the hollow cylinder shown in FIG. 4.

Referring to FIGS. 1 and 2, a solid cylinder (substrate) 2 having an external surface 4 is shown receiving a first coated layer 6 from a conventional plasma spray torch 8. The cylinder 2 is rotated while the thermal spray torch is moved back and forth along the length of cylinder 2. After depositing the first layer 6, FIG. 3 shows the plasma spray torch 8 depositing a second layer 10 on top of first layer 6. Thus the coated layer comprises first layer 6 and second layer 10. FIG. 4 shows the coated cylinder 2 axially aligned with a hollow cylinder 12. In this embodiment, the outer diameter X of coated cylinder 2 is slightly larger than the inner diameter Y of hollow cylinder 12. As also shown in FIG. 4, heating means 14 is activated to heat hollow cylinder 12 so that it will expand to increase its internal diameter Y to at least the dimension of the outer diameter X of cylinder 2 and preferably, to a dimension slightly larger than outer diameter X. While in the heated condition, coated cylinder 2 is inserted into heated hollow cylinder 12 as shown by the arrows whereupon the hollow cylinder 12 then cools so that its inner surface 13 contacts the outer surface 11 of the coated layer 10, as shown in FIG. 5. The solid cylinder 2 is then removed by mechanical or other means to leave the coated layers 6 and 10 secured to the inner surface 13 of hollow cylinder 12 as shown in FIG. 6. Thus, using the process of this invention, a hollow cylinder can be given an internal coated layer.

EXAMPLE

A 50 mm outer diameter solid cylinder was coated with a first layer of tungsten carbide-cobalt measuring 0.2 mm thick using a detonation gun. This was followed by a second coated layer of nickel-aluminum to a thickness of 0.3 mm using a plasma process. A steel tube was machined to produce a hollow cylinder measuring 100 mm outer diameter, 56.4 mm inner diameter by 15 mm in length. This steel tube was heated to expand thereby increasing its inner diameter and then the coated cylinder was inserted into the steel tube. At room temperature, the internal diameter of the steel tube contracted thereby securing the coated solid cylinder in the steel tube. By a mechanical turning operation, the 50 mm solid cylinder was removed from the steel tube leaving the coated layer secured to the inner surface of the steel tube.

While this invention has been described with reference to certain specific embodiments it will be recognized by those skilled in the art that many variations are possible without departing from the scope and spirit of the invention, and that the invention, as described by the claims, is intended to cover all changes and modifications of the invention which do not depart from the spirit of the invention. For example, in many applications the substrate would preferably be a hollow body, such as a hollow cylinder.

What is claimed:

1. A process for coating the internal surface of a hollow body comprising the steps:

(a) preparing a hollow body for receiving on at least a portion of its internal surface a coating;

(b) preparing a substrate having at least a portion of its external surface shaped to correspond to the internal surface of the hollow body to be coated;

(c) depositing on at least a portion of the external surface of the substrate at least one layer of a coating to a desired thickness and composition;

(d) inserting the coated substrate into the hollow body so that the coated surface of the substrate contacts the internal surface of the hollow body; and (e) removing the substrate from the hollow body by means selected from the group consisting of mechanical means, thermal means and chemical means while leaving the at least one layer of coating in contact with the internal surface of the hollow body thereby providing said hollow body with an internal coating.

2. The process of claim 1 wherein in step (d) the hollow body is heated to expand the internal surface of said hollow body and then inserting the coated substrate into the hollow body while it is still heated.

3. The process of claim 2 wherein the dimension of the external surface of the coated substrate is at least equal to the dimension of the internal surface of the hollow body to be coated.

4. The process of claim 1 wherein the hollow body is a cylinder and the external surface of the substrate is a cylinder.

5. The process of claim 4 wherein in step (d) the hollow body is heated to expand the hollow body and thereby expand the internal surface of said hollow body and then inserting the coated substrate into the hollow body while it is still heated.

6. The process of claim 5 wherein the dimension of the external surface of the coated substrate is at least equal to the dimension of the internal surface of the hollow body to be coated.

7. The process of claim 1 wherein the hollow body is made of a material selected from the group consisting of steel, nickel, cobalt, titanium, copper, aluminum and alloys thereof.

8. The process of claim 1 wherein the substrate is made of a material selected from the group consisting of steel, zinc, aluminum, copper, lead, iron, nickel, cobalt, titanium and alloys thereof, carbon-carbon composites, fiber reinforced composites and polymeric materials.

9. The process of claim 1 wherein in step (c) the means for depositing the coating is selected from the group consisting of plasma spray means, detonation gun means, electrolytic means, electroless means, physical vapor deposition means, chemical vapor deposition means and high velocity oxy-fuel means.

10. The process of claim 1 wherein in step (c) detonation gun means are used to deposit the coating on the substrate.

11. The process of claim 1 wherein in step (c) plasma spray means are used to deposit the coating on the substrate.

12. The process of claim 1 wherein in step (c) high velocity oxy-fuel means are used to deposit the coating on the substrate.

13. The process of claim 1 wherein in step (c) the coating composition is a tungsten based material.

14. The process of claim 1 wherein in step (e) the substrate is removed by mechanical means.

15. The process of claim 1 wherein in step (e) the substrate is removed by chemical means.

16. The process of claim 1 wherein in step (e) the substrate is removed by thermal means.

* * * * *